United States Patent [19]
Belart et al.

[11] 3,894,390
[45] July 15, 1975

[54] BRAKE VALVE FOR AN ANCILLARY BRAKE FORCE DEVICE IN MOTOR VEHICLES

[75] Inventors: Juan Belart, Walldorf; Hubertus von Grünberg, Niederhochstadt, both of Germany

[73] Assignee: ITT Industries, Inc., New York, N.Y.

[22] Filed: Feb. 4, 1974

[21] Appl. No.: 439,475

[30] Foreign Application Priority Data
Mar. 14, 1973 Germany............................ 2312641
Aug. 31, 1973 Germany............................ 2343882

[52] U.S. Cl..................................... 60/552; 91/372
[51] Int. Cl.............................................. F15b 7/08
[58] Field of Search ............ 60/547, 550, 552, 555, 60/567, 581; 91/372

[56] References Cited
UNITED STATES PATENTS
2,410,269  10/1946  Chouings............................. 91/372
3,815,364  6/1974  Belart et al........................... 60/552
3,817,037  6/1974  Belart................................... 60/552

Primary Examiner—Martin P. Schwadron
Assistant Examiner—H. Burks, Sr.
Attorney, Agent, or Firm—John T. O'Halloran; Menotti J. Lombardi, Jr.; Alfred C. Hill

[57] ABSTRACT

This relates to a control valve of a dual circuit master cylinder having an ancillary pressure source (an accumulator). The control valve renders the brake pressure dependent on brake pedal effort and brake pedal travel, but in which the brake pedal travel will not be unduly increased upon failure of the ancillary pressure source. The control valve includes a pressure-responsive travel simulator and an arrangement for displacing the master cylinder without actuating the travel simulator in case of ancillary pressure source failure.

15 Claims, 3 Drawing Figures

3,894,390

BRAKE VALVE FOR AN ANCILLARY BRAKE FORCE DEVICE IN MOTOR VEHICLES

BACKGROUND OF THE INVENTION

This invention relates to a brake valve for an ancillary brake force device in motor vehicles having a control unit including a valve spool and a control casing for directing flow of pressure medium into a pressure chamber in front of an end surface of a master cylinder piston closest to the brake pedal, a travel simulator to permit a brake-pedal travel conducive to a "brake feel," and components permitting mechanical sliding motion of the master cylinder piston by means of the brake pedal when the ancillary brake force has failed.

The German Pat. DT–OS No. 2,164,592 discloses a brake valve with a master cylinder piston actuating by pressure medium a first brake circuit. The end of the master cylinder piston on the side nearest to the brake pedal is designed as a control casing for a valve spool slidable via the brake pedal. Operation of the brake pedal causes the spool to be displaced within the master cylinder piston and thereby pressurizing a chamber situated between the brake pedal and the master cylinder piston. This latter chamber communicates with a second brake circuit. This method enables the brakes of the second brake circuit to be directly actuated by the pressure acting upon the master cylinder piston, while the brakes of the first brake circuit are indirectly actuated.

By virtue of the arrangement of the valve spool in the master cylinder piston, the brake-pedal travel is always proportional to the travel of the master cylinder piston even when the brake is actuated by the ancillary brake force. This is an important requirement in order to provide the vehicle operator with a "feel" for the brake output produced. However, the proportional relationship between master cylinder piston travel and pedal travel is a disadvantage if the pedal effort alone has to slow down the vehicle in the event of a failure of the ancillary brake force. Since the ratio at the brake pedal must be adapted to afford a sufficient amount of pedal travel for actuating the brake using the ancillary brake force, only part of the available pedal travel can be made use of when actuating the brake by foot without the ancillary brake force. Therefore, the aim is to separate the master cylinder piston from the control unit so as to enable the master cylinder piston to move away from the control unit when the brake is actuated by the ancillary brake force. In this case, there is no longer any need for the pedal travel available to correspond to the displacement of the master cylinder piston under the action of the ancillary brake force, the pedal travel may be even smaller. This permits the brake-pedal ratio to be designed large enough to generate a brake pressure as high as possible by pedal effort alone, making use of a pedal travel as large as possible when there is failure of the ancillary brake force.

Such a seperation between control unit and master cylinder piston is known from the German Pat. DT-OS No. 2,045,803. However, this well-known design has the disadvantage that, when the brake is actuated by the ancillary brake force, only that pedal travel is performed which is required for operating the control unit. This results in a marked decrease of the brake "feel."

Further, the German Pat. No. 1,206,323 discloses a brake valve for ancillary brake-force devices, the closing element thereof which controls the supply of pressure medium being hydraulically operable via a pedal-operated piston. The pressure prevailing in the brake system also acts upon the piston so that a counteracting force corresponding to the brake pressure is always present at the foot pedal. In order to also permit a pedal travel increasing in proportion to the increase in brake pressure after the supply of pressure medium out of an accumulator has begun, the known brake valve provides for a pedal-travel simulator. This simulator consists of two powerful springs against which a brake piston is allowed to move, thereby increasing the hydraulic volume in the brake valve.

SUMMARY OF THE INVENTION

An object of the present invention is to provide a control valve of the initially described type for a dual-circuit brake system, wherein the brake pressure is dependent on the pedal effort and the pedal travel and in which the pedal travel will not unduly increase when the ancillary brake force has failed.

A feature of the present invention is the provision of a brake valve for an ancillary brake force device in motor vehicles comprising: a housing having a longitudinal axis and a first bore disposed coaxial of the axis; a brake pedal disposed externally of and adjacent one end of the first bore; a master cylinder piston disposed within the first bore adjacent the other end thereof coaxial of the axis; a control casing disposed coaxial of the axis, slidably sealed to the inner surface of the first bore and having a second bore disposed coaxial of the axis; a control valve disposed within the second bore in a coupled relation with the brake pedal; a pressure medium accumulator; the control casing and the control valve being cooperatively coupled to the accumulator to apply pressure medium from the accumulator to a first end surface of the master cylinder piston closest to the brake pedal when the brake pedal is actuated; a travel simulator in a coupled relation to the brake pedal to permit brake pedal travel conducive to a "brake feel;" and at least one axially movable component to provide a rigid connection between the brake pedal and the master cylinder piston to provide mechanical axial motion of the master cylinder piston by means of the brake pedal when no pressure medium is supplied from the accumulator, the mechanical motion of the master cylinder piston being accomplished without actuating the travel simulator.

According to an advantageous embodiment of this invention, the rigid connection is established by the control casing slidably sealed in the brake-valve housing which is axially moved in the direction of the master cylinder piston by the pressure-medium supply against the force of a simulator spring. The simulator spring rests against an axially slidable simulator piston in the brake-valve housing. The simulator piston has one end adjacent the master cylinder piston which defines in part the pressure chamber at the end surface of the master cylinder piston closest to the brake pedal and the other end of the simulator piston closest to the pedal abuts a brake-valve housing stop when the pressure chamber is pressurized. The simulator piston has a coaxial piston rod axially slidable therein anchoring the simulator spring. One end of the piston rod abutting in rest position against the control casing while the other end rests against the end surface of the master cylinder piston closest to the pedal.

The displaceability of the control casing requires the valve spool actuated by the pedal to follow the control casing when the brake is applied. Thus, with the brake pressure increasing, the pedal travel available increases, too, so that the effect of the brake can be "felt" in the same manner as in the brake valve according to the German Pat. No. 1,206,323. The advantage of the arrangement according to the present invention consists in that with the ancillary force failing the pedal effort can be transmitted from the pedal to the master cylinder piston via the valve spool and further coaxial simply designed components. This renders the device more simple and reliable.

Owing to the fact that the simulator spring rests against a simulator piston, which is axially slidable within the brake valve housing, and one end of the simulator piston partially defines the pressure chamber at the end surface of the master cylinder piston nearest to the pedal, and the other end of the simulator piston closest to the brake pedal rests against a brake-valve housing stop when the pressure chamber is pressurized, it is possible to axially displace the master cylinder piston in the event of a failure of the ancillary brake force without tensioning the travel simulator spring. In contrast to prior-art brake valves equipped with travel simulators, the occurrence of braking losses is thus avoided. It is possible to rate the hydraulic forces at the travel simulator high enough to permit sufficient damping which inhibits control vibrations.

A further aspect of this invention includes a middle chamber located between the simulator piston and the control casing permanently communicating with an unpressurized reservoir; and a pressure chamber nearest to the brake pedal between the control casing and the adjacent end of the brake-valve housing is connected with the pressure chamber nearest to the master cylinder piston. In rest position the two end pressure chambers and the middle chamber communicate with each other via the valve spool while, upon valve spool operation, the middle chamber is first separated from the two end pressure chambers whereupon the two end pressure chambers can be actuated by pressure medium.

This design affords an easy method to move the control casing towards the master cylinder piston by virtue of the supplied ancillary pressure. Similarly, the simulator piston is firmly urged against its stop by the supplied pressure so that the simulator spring is tensioned when the control casing is being displaced. Since the supporting force acting upon the simulator piston automatically ceases when the ancillary brake force fails, it is possible to displace the simulator piston together with the master cylinder piston without any braking losses.

It would also be possible, of course, to obtain the desired effects by differently dimensioning the actuating surfaces of the control casing and the simulator piston. However, the advantageous embodiment of the invention herein described offers the advantage that it is of simple design and that it can be implemented using but a small number of seals, this being an important feature with regard to the sensitivity of the brake and the small frictional forces when the ancillary brake force fails.

The brake valve constructed in accordance with this invention is suitable for use in multi-circuit brake system in various ways. A particularly straight forward design provides for the master cylinder piston to actuate by pressure medium a first brake circuit and for the pressure chamber at the end surface of the master cylinder piston closest to the brake pedal to communicate with a second brake circuit.

According to a further advantageous embodiment of this invention, the rigid connection consists of a cup-shaped end piece of the brake-pedal tappet, two axially movable rods, and a levelling member abutting against the master cylinder piston.

By virtue of this latter embodiment, the master cylinder piston can be actuated without loss of travel via the cup-shaped end piece of the brake-pedal tappet, the axially movable rods, and the levelling member when the ancillary brake force fails. The travel simulator does not elongate the pedal travel since in this case no forces have to be transmitted via it.

All embodiments of the brake valve herein described render it possible to design the master cylinder piston in an optimum manner for actuation when the ancillary brake force fails. Owing to the fact that the pressure of one brake circuit directly acts upon a master cylinder piston which actuates by pressure the other brake circuit, there is only a very small pressure different between the two brake circuits. Thus, the brake valve constructed according to this invention is very suitable for use in brake devices having diagonally connected brake circuits.

A still further advantageous embodiment of this invention includes a control piston having the same diameter adjacent the two pressure medium chambers connected with an unpressurized reservoir, a blind-end bore opened towards the brake pedal tappet, a simulator piston disposed in a sealed relation within the bore, a rod fastened to the simulator piston and the brake pedal tappet, and a travel simulator in the form of one or several pressure springs disposed immediately between the control piston and the brake pedal tappet.

BRIEF DESCRIPTION OF THE DRAWING

Above-mentioned and other features and objects of this invention will become more apparent by reference to the following description taken in conjunction with the accompanying drawing, in which.

DESCRIPTIONN OF THE PREFERRED EMBODIMENTS

Figure 1:
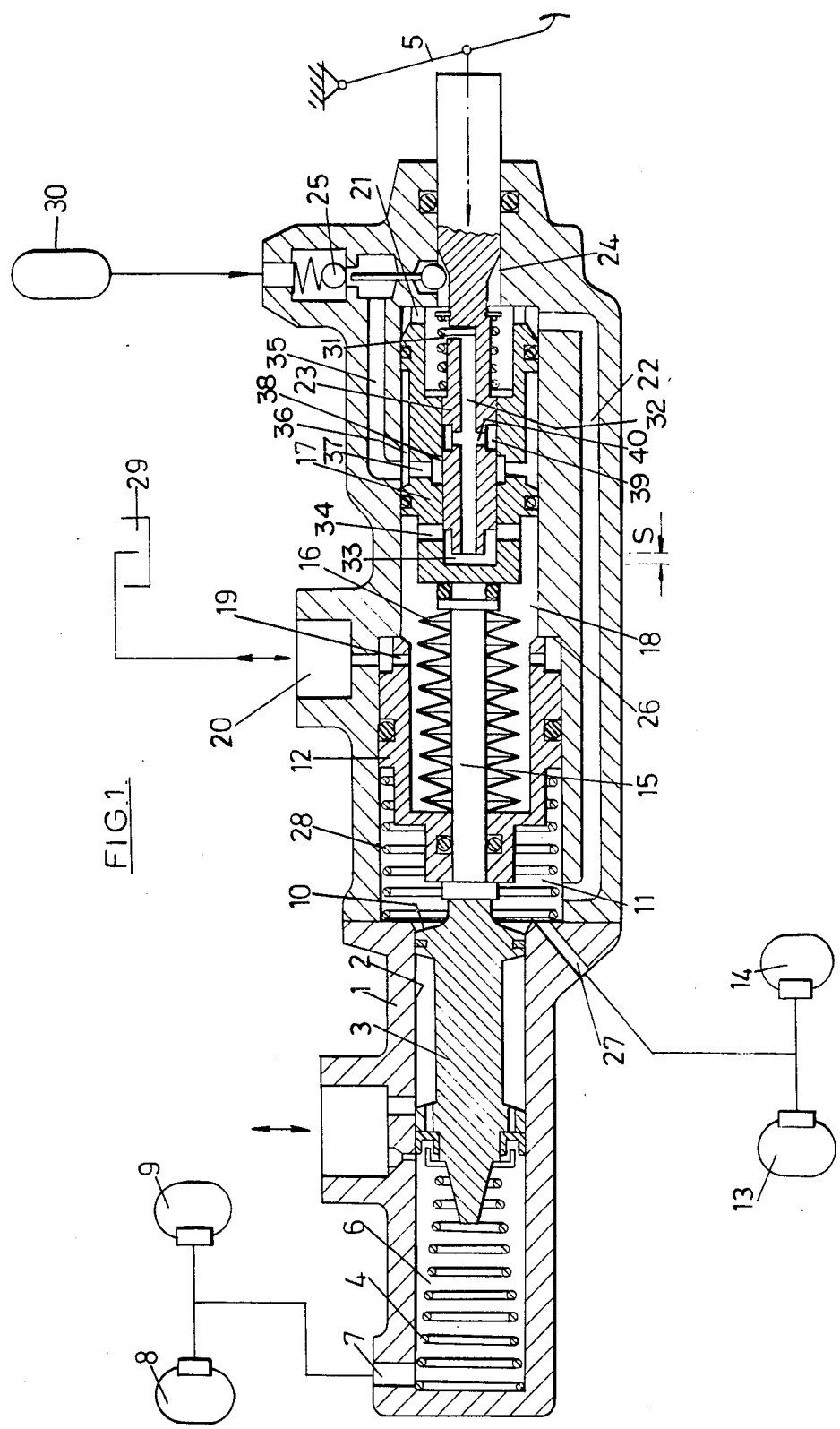
FIG. 1 is a longitudinal cross sectional view of a first embodiment of a brake valve constructed in accordance with the principles of the present invention.

The brake valve of FIG. 1 includes a brake valve housing 1 having a multiple-stepped longitudinal bore 2. A master cylinder piston 3 disposed in a slidably sealed relation to bore 2 which is biased towards a brake pedal 5 by means of a return spring 4 forms a working chamber 6 in longitudinal bore 2. Pressure medium is supplied from chamber 6 by movement of piston 3 to the left in the drawing to actuate the brakes 8 and 9 via a port 7.

The master cylinder piston 3 has an end surface 10 closest to brake pedal 5 axially defining in one direction a chamber 11. In its other axial direction, pressure chamber 11 is defined by a simulator piston 12. Chamber 11 further includes a port 27 permitting pressure medium to be fed to the brakes 13 and 14. It is to be understood that in passenger vehicles brakes 8 and 9 usually refer to the front-wheel brakes while brakes 13 and 14 usually refer to the rear-wheel brakes. In the rest position of simulator piston 12, the end of piston 12 closest to brake pedal 5 is urged against a housing stop 26 by means of a weak pressure spring 28.

Simulator piston 12 has a piston rod 15 axially slidable therein. Rod 15 anchors a simulator spring 16 resting against simulator piston 12.

The end of piston rod 15 closes to brake pedal 5 abuts against a control casing 17 which is axially slidable within and sealed to longitudinal bore 2 of brake valve housing 1. In this arrangement, a middle chamber 18 is defined between control casing 17 and simulator piston 12. Chamber 18 permanently communicates with an unpressurized reservoir 29 via a bore 19 in simulator piston 12 and a port 20 of brake valve housing 1.

Between control casing 17 and the end of the brake valve housing 1 closest to brake pedal 5, a pressure chamber 21 is provided adjacent brake pedal 5. Chamber 21 permanently communicates, via a channel 22, with pressure chamber 11. In the control casing 17, there is provided a valve spool 23 extending out of brake valve housing 1 and being rigidly connected with brake pedal 5. Valve spool 23 is allowed to move by a small amount S in control casing 17. When valve spool 23 is in its rest position pressure chambers 11 and 21 communicate with the unpressurized reservoir 29 via transverse bore 31 in valve spool 23, longitudinal bore 32 in valve spool 23, chamber 33 in control casing 17, transverse bore 34 through control casing 17, middle chamber 18, bore 19 through simulator piston 12, and port 20 through housing 1. When valve spool 23 moves to the left in the drawing it closes bore 34 and disconnects pressure chambers 11 and 21 from reservoir 29 and then pressurize chambers 11 and 21 as follows. Ramp 24 opens accumulator valve 25 permitting pressurized pressure medium to enter bore 35 in housing 1. This pressurized medium then pressurizes chambers 11 and 21 via control groove 36 in control casing 17, bore 37 in control casing 17, control groove 38 in control casing 17, control groove 39 in valve spool 23 which overlaps groove 38 upon the leftward movement of valve spool 23, transverse bore 40 in valve spool 23, longitudinal bore 32 in valve spool 23 and transverse bore 31 in valve spool 23.

For the description of operation of the brake valve herein disclosed, it is assumed that the ancillary brake force from accumulator 30 is available for applying the brake.

By actuating brake pedal 5, accumulator-charging valve 25 is first moved into open position. Thus, pressure medium from pressure accumulator 30 is supplied to control casing 17. By further shifting of control valve spool 23, the connection between pressure chamber 21 and chamber 18 is first separated so that the pressure chambers 21 and 11 are no longer connected with reservoir 29. Thereupon, control groove 39 of valve spool 23 overlaps control groove 38 of control casing 17 containing pressure medium so that pressure chamber 21 and pressure chamber 11 are supplied with pressure simultaneously. Because of the pressurized pressure medium supplied to pressure chamber 11 simulator piston 12 is firmly kept against housing stop 26. Since the master cylinder piston 3 is not rigidly connected with piston rod 15, and since the diameter of master cylinder piston 3 is smaller than the diameter of simulator piston 12, the pressure supplied to pressure chamber 11 results in a movement of master cylinder piston 3 to the left in the drawing and away from piston rod 15.

The pressure increase in pressure chamber 21 causes control casing 17 to be displaced which casing rests against piston rod 15. Since piston rod 15 is axially slidable within simulator piston 12, piston rod 15 is allowed to move towards master cylinder piston 3, thereby compressing simulator spring 16. In this arrangement, in order to further actuate the brake, movement of valve spool 23 has to follow the movement of control casing 17, whereby the pedal travel required for brake actuation is obtained.

If the ancillary energy has failed, valve spool 23 is first allowed to be shifted against the bottom of control casing 17 by the amount S without encountering any resistance. With further actuation of brake pedal 5, master cylinder piston 3 is shifted via piston rod 15 without further loss of travel so that pressure is permitted to build up in working chamber 6, and, thus, brakes 8 and 9 can be actuated by pressure medium now as before.

If the brake circuit assigned to working chamber 6 fails, master cylinder piston 3 moves to the left in the drawing owing to the pressure medium fed into pressure chamber 11 from pressure chamber 21 and valve spool 23 until piston 3 touches the bottom of working chamber 6. In this arrangement, there is no travel loss at brake pedal 5 since no volume has to be displaced, but on the contrary only pressure medium has to be fed via valve spool 23. With further actuation of brake pedal 5, the pressure in pressure chamber 11 is further built up, thus, resulting in a pressure application of brakes 13 and 14.

Figure 2:
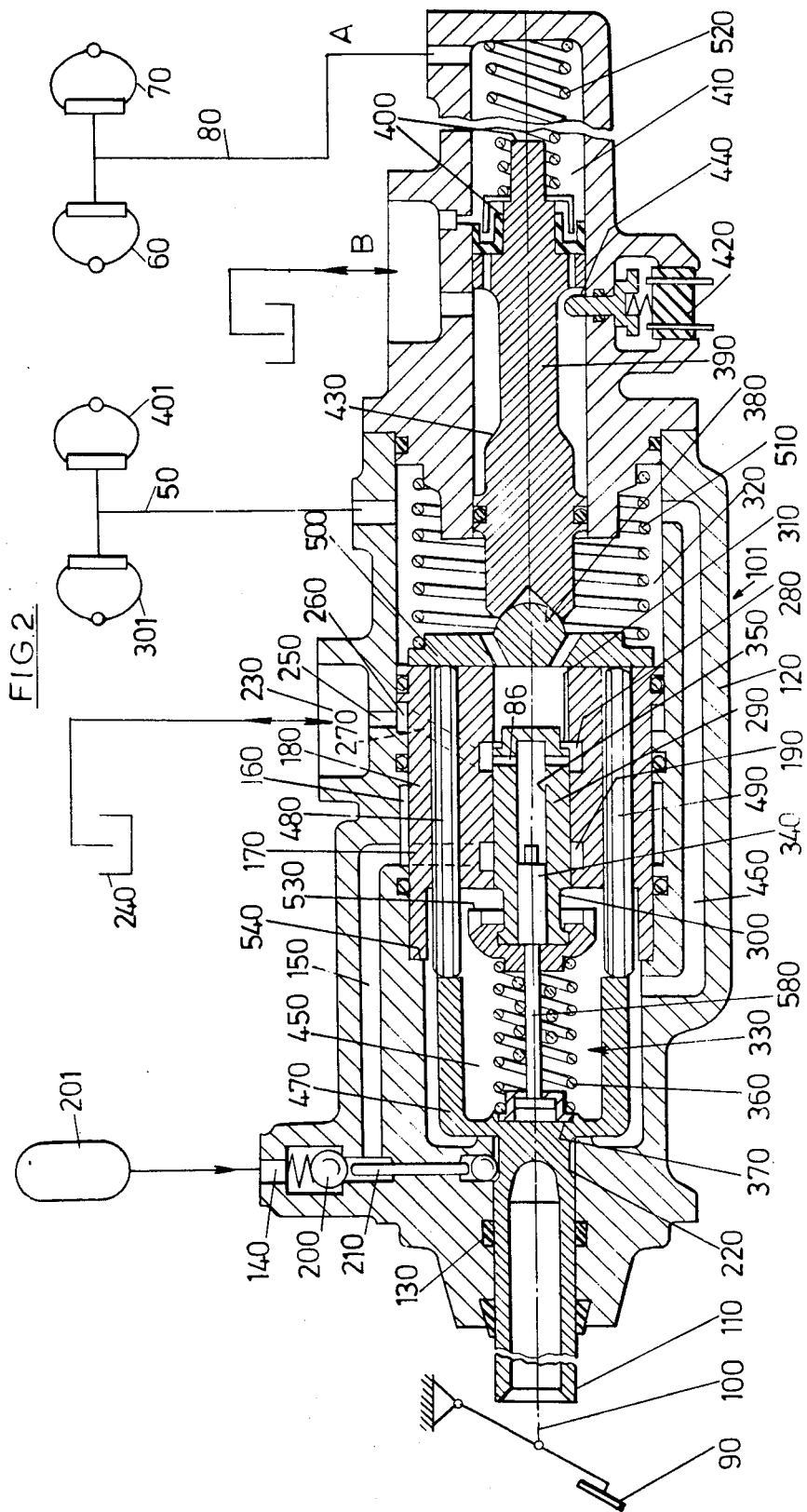
FIG. 2 is a longitudinal cross sectional view of a second embodiment of the brake valve constructed in accordance with the principles of the present invention.

FIG. 2 shows a brake valve 101 via which the brake circuits 301 and 401 of a rear-axle brake circuit 50 and brakes 60 and 70 of a front-axle brake circuit 80 can be independently actuated by an ancillary force out of a pressure accumulator 201. For actuation of brake valve 101, there is a brake pedal 90 which is connected via rod 100 with a brake-pedal tappet 110. Brake valve 101 has a housing 120 with the brake-pedal tappet 110 being arranged in a sealed relationship thereto by means of a seal 130.

Pressure accumulator 201 is connected with housing 120 of the brake valve via a connector 140. In the interior of housing 120, a pressure-medium channel 150 leads from connector 140 to an annular groove 160. Groove 160 is connected with a control groove 190 via a radial bore 170 of a sleeve 180. A non-return valve 200 closing in the direction of the pressure-medium channel 150 is provided between pressure-medium channel 150 and connector 140. For opening valve 200, a valve tappet 210 is radially displaceable by means of a ramp 220 provided on brake-pedal tappet 110.

Housing 120 of brake valve 101 further includes a connector 230 connected with an unpressurized reservoir 240. Connector 230 communicates, via a bore 250, an annular chamber 260, and a bore 270, with a second control groove 280 in sleeve 180. Within sleeve 180, there is provided an axially movable control piston 290 having control grooves 300 and 310. The mutual distance and the width of control grooves 300 and 310 are so dimensioned that in the one rest position of control piston 290, a pressure-medium chamber 320 on the side of control piston 290 remote from brake pedal 90 is connected, via control grooves 310 and 280, bore 270, annular chamber 260, bore 250, and connector 230, with the reservoir 240.

Control piston 290 communicates, by means of a travel simulator 330, with brake-pedal tappet 110. Simulator 330 includes a simulator piston 340 sealed to and axially movably within control piston 290 in a blind-end bore 350 which is open on the side nearest to the brake pedal. The blind-end bore 350 is connected with reservoir 240 by means of a cross bore 86 via control groove 280. Simulator piston 340 has a rod 580 fastened to brake-pedal tappet 110 by means of a spring cap 370 at brake-pedal tappet 110. Pressure springs 360 of simulator 330 are supported on the one end by control piston 290 and on the other end by spring cap 370.

A master cylinder piston 390 projects with an end surface 380 closest to brake-pedal tappet 110 into pressure-medium chamber 320. When end surface 380 is actuated by pressure, master cylinder piston 390 forces via end surface 400 pressure medium out of a master-cylinder chamber 410 into front-axle brake circuit 80.

In housing 120 of brakes valve 101, a warning switch 420 is provided in the area of master cylinder piston 390 which switch is so designed that in the second half of the maximum possible stroke of master cylinder piston 390, an electric circuit is closed For this purpose, this embodiment provides for a stop ramp 430 at master cylinder piston 390 and a pin 440 at warning switch 420. On the side of the control piston 290 nearest to brake pedal 90, a pressure-medium chamber 450 is provided which permanently communicates with the pressure-medium chamber 320 via a channel 460 in housing 120 of brake valve 101.

In order to keep the front-axle brake circuit operable when the pressure accumulator 201 fails, brake-pedal tappet 110 has a cup-shaped end piece 470 abutting against two rodos 480 and 490 which are axially slidable in sleeve 180. Rods 480 and 490 in turn lie against a levelling member 500 in pressure chamber 320. Member 500 contacts end surface 380 of master cylinder piston 390. By restoring springs 510 and 520, rods 480 and 490, member 500, end piece 470 and end surface 380 are held in mutual abutment as long as no pressure is applied from accumulator 201.

In order to prevent overriding of control piston 290, piston 290 is provided with a stop 530. Stop 530 makes it necessary to have sleeve 180 axially movable in brake valve 101 which will be explained in the subsequent description of operations. However, under normal operating conditions, sleeve 180 is held against a stop 540 of housing 120 of brake valve 101, which stop is nearest to brake pedal 90, either by resilient means or by an actuation surface which is larger in pressure-medium chamber 320 than in pressure-medium chamber 450.

In order to describe the operation of the brake valve of FIG. 2. according to this invention, it is first assumed that there is an ancillary force in accumulator 201 and that both brake circuits are functioning properly.

When actuating brake pedal 90, brake-pedal tappet 110 moves into brake valve 101. In this process, valve tappet 210 is first shifted upwardly by virtue of ramp 220 so that non-return valve 200 is opened and pressure medium is allowed to flow from pressure accumulator 201 into the control groove 190 via pressure-medium channel 150.

By applying brake pedal 90, control piston 290 also moves to the right as shown in the drawing. The master cylinder piston 390 is further shifted via end piece 470, the rods 480 and 490, and levelling member 500. Sleeve 180 remains in its position illustrated as its friction in housing 120 of brake valve 101 is considerably higher than the friction of control piston 290 in sleeve 180. As has been mentioned before, resilient means may be provided additionally to hold sleeve 180 against its stop 540.

Movement of control piston 290 relative to sleeve 180 causes control groove 300 to come into the area of control groove 190. This permits pressure medium to flow out of pressure accumulator 201 into pressure-medium chamber 450, and from there via the channel 460 into the pressure-medium chamber 320. This pressure medium in pressure-medium chamber 320 is applied to end surface 380 of master cylinder piston 390 so that piston 390 moves away from levelling member 500 and generates pressure in the master cylinder chamber 410, thus, applying pressure to front-axle brake circuit 80. Since pressure-medium chamber 320 is directly connected to rear-axle brake circuit 50, circuit 50 also has pressure applied thereto.

In pressure-medium chamber 450, the pressure medium supplied acts upon the surface of brake-pedal tappet 110 situated adjacent seal 130. Thus, the driver is provided with the "feel" of a force at brake pedal 90 which corresponds to the brake pressure.

Control groove 310 is so arranged that prior to pressure medium flowing from control groove 190 into pressure chamber 450, the connection from pressure-medium chamber 320 via the control groove 280 into reservoir 240 is closed, while a connection from blind-end bore 350 via the cross bore 86 of control groove 280, bore 270, annular chamber 260, bore 250, and connector 230 to the reservoir 240 is permanently maintained. Thus, a force acts in pressure-medium chamber 450 upon simulator piston 340 so that with further pedal actuation piston 340 moves into blind-end bore 350 against the force of pressure spring 360. The control piston 290, however, tends to be displaced in the direction of brake-pedal tappet 110 owing to the effect of simulator piston 340 and springs 360 so that control groove 300 is again moved past control groove 190 and the pressure-medium supply into the pressure-medium chamber 450 is terminated. In this way, for actuating control piston 290, brake-pedal tappet 110 has to cover an increasing distance with the increasing pressure in the brake valve 101.

When the ancillary force in pressure accumulator 201 fails, master cylinder piston 390 is first shifted via cup-shaped end piece 470, axially displaceable rods 480 and 490, and levelling member 500. As soon as control piston 290 lies with its stop 530 against sleeve 180, sleeve 180 will be displaced with further brake actuation together with rods 480 and 490. This permits master cylinder piston 390 to be actuated without any loss of travel. Also, the force of the simulator spring does not have to be overcome.

If there is a failure of front-axle brake circuit 80 which is connected to master cylinder chamber 410, master cylinder piston 390 will move up to the stop when the brake is applied. This is caused by supply of pressure medium from pressure accumulator 201. This process does not require an elongated pedal travel since the volume necessary for displacing the master cylinder piston 390 is taken from pressure accumulator 201. For this reason, the driver being unable to know the extent of the stroke of the master cylinder piston 390 occurring during braking, warning switch 420 has been so arranged in housing 120 of the brake valve that it provides a warning signal in the second half of the maximum possible stroke. Thus, possible air inclusions or steam bubbles developing in the brake system are indicated to the vehicle operator. Also, a differential-pressure warning switch can be omitted when in addition to switch 420 an indicating device for the accumulator pressure is provided.

Figure 3:
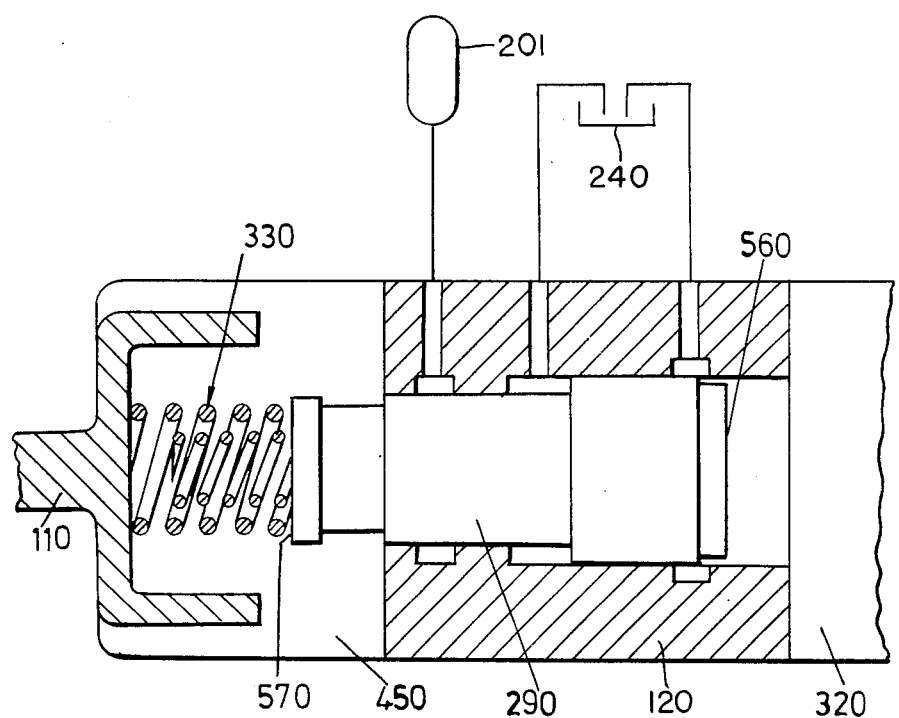
FIG. 3 is a longitudinal cross sectional view of a detail of a third embodiment of the present invention in the area of the control piston.

The embodiment shown in FIG. 3 differs from the embodiment of FIG. 2 only in that the control piston 290 in pressure-medium chamber 320 has an actuation surface 560 which is larger than the actuation surface 570 in pressure-medium chamber 450. This has as a result that when pressure-medium chambers 450 and 320 are pressurized control piston 290 tends to move in the direction of brake-pedal tappet 110. This avoids the necessity for simulator piston 340 required in the embodiment of FIG. 2. The connections through housing 120 to accumulator 201 and to reservoir 240 are only shown schematically. The actual implementation would be identical to that shown and described with respect to FIG. 2.

While we have described above the principles of our invention in connection with specific apparatus it is to be clearly understood that this description is made only by way of examaple and not as a limitation to the scope of our invention as set forth in the objects thereof and in the accompanying claims.

We claim:

1. A brake valve for an ancillary brake force device in motor vehicles comprising:
   a housing having a longitudinal axis and a first bore disposed coaxial of said axis;
   a brake pedal disposed externally of and adjacent one end of said first bore;
   a master cylinder piston disposed within said first bore adjacent the other end thereof coaxial of said axis;
   a control casing disposed coaxial of said axis, slidably sealed to the inner surface of said first bore adjacent said one end of said first bore in a tandem relationship with said master cylinder piston, said control casing having a second bore disposed coaxial of said axis;
   a control valve disposed within said second bore in a coupled relation with said brake pedal;
   a pressure medium accumulator;
   said control casing and said control valve being cooperatively coupled to said accumulator to apply pressure medium from said accumulator to a first end surface of said master cylinder piston closest to said brake pedal when said brake pedal is actuated;
   a travel simulator in a coupled relation to said brake pedal to permit brake pedal travel conducive to a "brake feel"; and
   at least one axially movable component to provide a rigid connection between said brake pedal and said master cylinder piston to provide mechanical axial motion of said master cylinder piston by means of said brake pedal when no pressure medium is supplied from said accumulator, said mechanical motion of said master cylinder piston being accomplished without actuating said travel simulator.

2. A brake valve according to claim 1, wherein said travel simulator includes
   a simulator piston disposed coaxially of said axis and slidably sealed to the inner surface of said first bore between said control casing and said master cylinder piston, a transverse end surface of said simulator piston adjacent said master cylinder piston and said first end surface of said master cylinder piston defining a first pressure chamber, said transverse end surface of said simulator piston closest to said brake pedal abutting a stop on the inner surface of said housing, and
   a simulator spring disposed coaxial of said axis and between a transverse end surface of said control casing adjacent said simulator piston and said transverse end surface of said simulator piston adjacent said master cylinder piston; and
said component includes
   a piston rod disposed coaxial of said axis and in a slidably sealed relation with said transverse surface of said simulator piston adjacent said master cylinder piston, said piston rod supporting said spring, one end of said piston rod resting against said transverse end surface of said control casing adjacent said simulator piston and the other end of said piston rod resting against said first end surface of said master cylinder piston.

3. A brake valve according to claim 2, wherein adjacent transverse surfaces of said control casing and said simulator piston define a second pressure chamber,
   an unpressurized reservoir communicates with said second pressure chamber,
   a third pressure chamber defined by a transverse surface of said control casing adjacent said brake pedal and a transverse end wall of said housing adjacent said brake pedal,
   a housing channel interconnecting said first and third pressure chambers,
   said first, second and third pressure chambers communicating with each other via said control valve in the rest position of said control piston and when said control valve is actuated said second pressure chamber is separated from said first and third pressure chambers and pressure medium is supplied from said accumulator to said first and third pressure chambers.

4. A brake valve according to claim 3, wherein said master cylinder piston actuates a first brake circuit connected to a fourth pressure chamber defined by a second end surface of said master cylinder piston remote from said brake pedal, and
said first pressure chamber actuates a second brake circuit connected thereto.

5. A brake valve according to claim 4, wherein said master cylinder piston is a tandem master cylinder piston.

6. A brake valve according to claim 1, wherein said rigid connection is provided by
a cup-shaped end piece of a brake pedal tappet connected to said brake pedal,
   two axially movable rods parallel to said axis, and
   a levelling member disposed transverse of said axis connected to said two rods and abutting said first end surface of said master cylinder piston.

7. A brake valve according to claim 6, wherein
a transverse surface of said levelling member adjacent said first end surface of said master cylinder piston and said first end surface of said master cylinder piston define a first pressure chamber connected to a first brake circuit, and
a second end surface of said master cylinder piston remote from said brake pedal and an end wall of said housing remote from said brake pedal define a second pressure chamber connected to a second brake circuit.

8. A brake valve according to claim 7, further including
a third pressure chamber is defined by said brake pedal tappet and an adjacent transverse surface of said control casing; and
a housing channel interconnecting said first and third pressure chambers.

9. A brake valve according to claim 8, wherein
said control valve includes
a control piston having a blind-end bore coaxial of said axis opening toward said brake-pedal tappet, said blind-end bore being connected with an unpressurized reservoir; and
said travel simulator includes
a simulator piston axially slidable in said blindend bore,
a piston rod coaxial of said axis disposed in said third pressure chamber interconnecting said simulator piston and said brake-pedal tappet, and
at least one pressure spring disposed coaxial of said rod between said control piston and said brake pedal tappet.

10. A brake valve according to claim 9, further including
a rigid stop connected to said control piston in said third pressure chamber to prevent said control piston from overriding.

11. A brake valve according to claim 10, wherein
said control casing includes
a sleeve that is axially displaceable in said housing and which is held in a normal position against a stop on the inner surface of said housing within said third pressure chamber.

12. A brake valve according to claim 11, wherein
an actuating end surface of said sleeve adjacent said master cylinder piston is larger than an actuating end surface of said sleeve adjacent said brake pedal.

13. A brake valve according to claim 12, wherein
said two axially movable rods pass through said sleeve.

14. A brake valve according to claim 8, wherein
a first actuating end surface of said control piston adjacent said master cylinder piston is larger than a second actuating end surface of said control piston adjacent said brake pedal tappet, and
said travel simulator includes
at least one pressure spring disposed coaxial of said axis between said second actuating end surface of said control piston and said brake pedal tappet.

15. A brake valve according to claim 6, further including
a warning switch disposed adjacent said master cylinder piston rendered operable in the second half of the maximum possible stroke of said master cylinder piston.

* * * * *